(12) United States Patent
Pyo

(10) Patent No.: US 11,667,295 B2
(45) Date of Patent: Jun. 6, 2023

(54) APPARATUS AND METHOD FOR RECOGNIZING OBJECT

(71) Applicant: HL KLEMOVE CORP., Incheon (KR)

(72) Inventor: EunJong Pyo, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 301 days.

(21) Appl. No.: 17/016,501

(22) Filed: Sep. 10, 2020

(65) Prior Publication Data

US 2021/0073559 A1 Mar. 11, 2021

(30) Foreign Application Priority Data

Sep. 10, 2019 (KR) .......................... 10-2019-0111882

(51) Int. Cl.
  *B60W 40/02* (2006.01)
  *B60W 40/04* (2006.01)
  *G06V 20/58* (2022.01)
  *G06V 20/56* (2022.01)
  (Continued)

(52) U.S. Cl.
  CPC ............ *B60W 40/02* (2013.01); *B60W 40/04* (2013.01); *G06V 10/763* (2022.01);
  (Continued)

(58) Field of Classification Search
  CPC .... G06V 20/58; G06V 20/588; G06V 10/763; G06V 10/764; B60W 40/04;
  (Continued)

(56) References Cited

U.S. PATENT DOCUMENTS

2019/0130182 A1*  5/2019  Zang .................... G06V 20/182
2019/0156128 A1*  5/2019  Zhang .................. G06K 9/6274
(Continued)

FOREIGN PATENT DOCUMENTS

JP  2015-81886 A  4/2015
JP  2019-21317 A  2/2019
(Continued)

OTHER PUBLICATIONS

Office Action dated Mar. 31, 2023, for corresponding Korean Patent Application No. 10-2019-0111882 (4 pages).

*Primary Examiner* — Santiago Garcia
(74) *Attorney, Agent, or Firm* — Hauptman Ham, LLP

(57) ABSTRACT

The present disclosure relates to an object recognition apparatus and method. Specifically, the object recognition apparatus according to the present disclosure comprises: an object information collector configured to collect object information based on driving information of a vehicle and surrounding detection information detected around the vehicle; an object selector configured to select an object corresponding to a predetermined first tolerance range based on the object information; a tolerance range setter configured to set a second tolerance range based on the driving information and the object information when a moving object exists among the objects corresponding to the first tolerance range; and a guardrail recognizer configured to determine whether the moving object falls within the second tolerance range based on the object information, and recognize a guardrail based on object information of the moving object corresponding to the second tolerance range.

14 Claims, 12 Drawing Sheets

(51) Int. Cl.
*G06V 10/762* (2022.01)
*G06V 10/764* (2022.01)

(52) U.S. Cl.
CPC ............ *G06V 10/764* (2022.01); *G06V 20/58* (2022.01); *G06V 20/588* (2022.01); *B60W 2554/4042* (2020.02); *B60W 2554/4044* (2020.02)

(58) Field of Classification Search
CPC . B60W 2554/4042; B60W 2554/4044; B60W 40/02; B60W 2420/52; B60W 2554/20; B60W 2554/40; B60W 2554/804; B60W 30/165; B60W 40/105; B60W 2520/10; G06K 9/6221; B60R 21/0134; G01S 13/931; G06T 7/20; G08G 1/22
See application file for complete search history.

(56) References Cited

U.S. PATENT DOCUMENTS

| | | | | |
|---|---|---|---|---|
| 2019/0241187 A1* | 8/2019 | Maus | ............... | B60W 30/143 |
| 2020/0348408 A1* | 11/2020 | Peng | ............... | G06V 10/811 |
| 2021/0080568 A1* | 3/2021 | Brown | ............... | G01S 13/87 |
| 2022/0146625 A1* | 5/2022 | Nishikido | ............ | G01S 7/4026 |
| 2022/0176975 A1* | 6/2022 | Nakamura | .......... | B60W 40/105 |

FOREIGN PATENT DOCUMENTS

| | | |
|---|---|---|
| KR | 10-1292606 B1 | 8/2013 |
| KR | 10-1394574 B1 | 5/2014 |
| KR | 10-2015-0127745 A | 11/2015 |

\* cited by examiner

APPARATUS AND METHOD FOR RECOGNIZING OBJECT

CROSS REFERENCE TO RELATED APPLICATION

This application claims priority from Korean Patent Application No. 10-2019-0111882, filed on Sep. 10, 2019, which is hereby incorporated by reference for all purposes as if fully set forth herein.

BACKGROUND OF THE INVENTION

1. Field of the Invention

The present disclosure relates to an apparatus and method for recognizing an object.

2. Description of the Prior Art

Measurement results, such as distance to an object, relative speed, and angle values measured by a vehicle radar device, have been used in vehicle applications to improve vehicle safety and comfort. These vehicle applications may include a collision mitigation braking system (CMB) that mitigates damage when the host vehicle collides with an obstacle in front, an adaptive cruise control system (ACC) that follows the vehicle in front, and a blind spot warning system (BSW) which alerts the driver when there is a danger during the lane change and other vehicles approaching from the rear while the vehicle is driving and improves the safety of the vehicle driving.

In the system for monitoring the side of the host vehicle such as the BSW system described above, it is necessary to determine whether the object currently detected on the side of the host vehicle by the radar device is the object to be alerted. In particular, since structures such as guard rails are often present on the side of the road, it is necessary to identify whether the detected object is a structure such as a guard rail or another vehicle.

In general, radar devices can detect the relative speed between the object and the vehicle. For this reason, it is possible to some extent to identify whether the object is a structure or another vehicle based on the difference in relative speed. However, in the radar device like the FMCW (Frequency-Modulated Continuous-Wave) method, when calculating the relative speed of the object using the Doppler component, it is only possible to obtain the relative velocity component in the direction perpendicular to the tangent line of the circle centered on the radar device. For this reason, when another vehicle passes right next to the host vehicle, the Doppler component of the other vehicle becomes zero, and the relative speed cannot be detected. Similarly, the Doppler component of structures, such as guardrails, that exist right next to the host vehicle is also zero. As a result, when another vehicle passes the side of the host vehicle, there may be a problem that it is difficult to identify whether the object is the structure or other vehicles.

SUMMARY OF THE INVENTION

For this background, the present disclosure is to provide the object recognition apparatus and method for accurately recognizing the structure such as a guard rail even if the physical characteristics of the object are distorted.

In addition, the present disclosure is to provide the object recognition apparatus and method that provides driving convenience and driving stability to a driver by accurately recognizing structures such as guardrails.

In accordance with an aspect of the present disclosure, there is provided an object recognition apparatus comprising: an object information collector configured to collect object information based on driving information of a vehicle and surrounding detection information detected around the vehicle; an object selector configured to select an object corresponding to a predetermined first tolerance range based on the object information; a tolerance range setter configured to set a second tolerance range based on the driving information and the object information when a moving object exists among the objects corresponding to the first tolerance range; and a guardrail recognizer configured to determine whether the moving object falls within the second tolerance range based on the object information, and recognize a guardrail based on object information of the moving object corresponding to the second tolerance range.

In accordance with another aspect of the present disclosure, there is provided an object recognition method comprising: collecting object information based on driving information of a vehicle and surrounding detection information detected around the vehicle; selecting an object corresponding to a predetermined first tolerance range based on the object information; setting a second tolerance range based on the driving information and the object information when a moving object exists among the objects corresponding to the first tolerance range; and determining whether the moving object falls within the second tolerance range based on the object information, and recognize a guardrail based on object information of the moving object corresponding to the second tolerance range.

According to the present disclosure, the present disclosure can provide the object recognition apparatus and method for accurately recognizing the structure such as a guard rail even if the physical characteristics of the object are distorted.

In addition, according to the present disclosure, the present disclosure can provide the object recognition apparatus and method that provides driving convenience and driving stability to a driver by accurately recognizing structures such as guardrails.

DETAILED DESCRIPTION OF THE EXEMPLARY EMBODIMENTS

Figure 1:
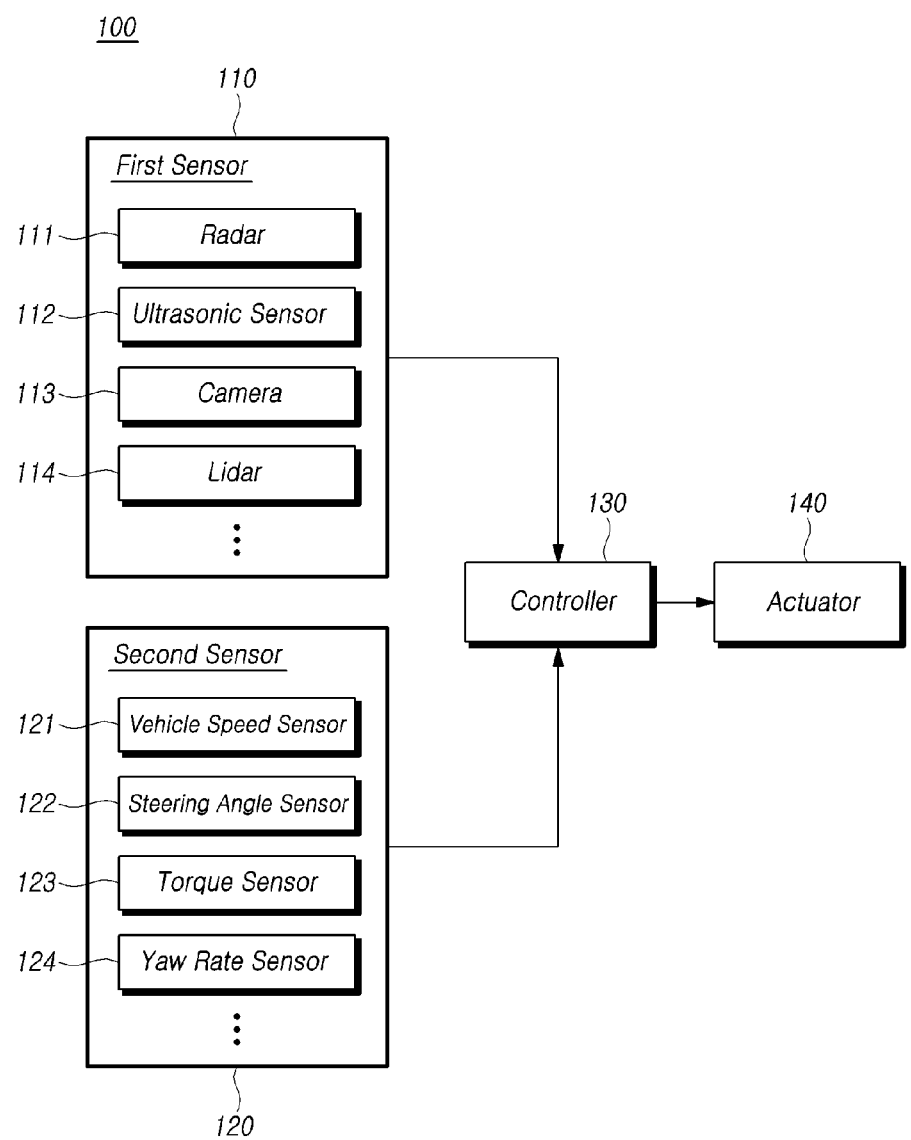
FIG. 1 is a block diagram illustrating a vehicle control system according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another.

Such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

FIG. 1 is a block diagram illustrating an embodiment of the vehicle control system 100 according to the present disclosure.

Referring to FIG. 1, the vehicle control system 100 according to the present disclosure may include a first sensor 110, a second sensor 120, a controller 130, and an actuator 140.

The first sensor 110 may be disposed on the vehicle so as to have a field of view of the exterior of the vehicle and configured to obtain surrounding detection information. Here, the surrounding detection information may refer to information on the surrounding environment of the vehicle (pedestrian, road, lane, infrastructure, etc.), and the field of view of the vehicle outside may refer to a detecting area to the exterior of the vehicle.

There may be more than one first sensor 110, and at least one first sensor 110 may be mounted on each portion of the vehicle to have a field of view toward the front, side, or rear of the vehicle.

The first sensor 110 may include an image sensor for capturing image data, a non-image sensor for acquiring non-image data, and the like. For example, the first sensor 110 may include a camera corresponding to an image sensor, a lidar 113, a radar sensor 111 or an ultrasonic sensor corresponding to the non-image sensor.

Here, image information captured from the image sensor may be composed of image data captured by using the image sensor. Hereinafter, in the present disclosure, image information captured from the image sensor means image data captured from an image sensor.

Image data captured by the image sensor may be generated, for example, in one format of raw format AVI, MPEG-4, H.264, DivX, and JPEG. Image data captured by the first sensor 110 may be processed by a processor. The image sensor may be an image sensor having relatively wide angle of view and relatively high resolution. For example, the image sensor may have a field of view of about 100° and a resolution of about 10 μm. However, the present disclosure is not limited thereto, and the image sensor of the present disclosure may mean a sensor having the widest angle of view among possible sensors.

The non-image sensor may be disposed in the vehicle to have a detection area for the exterior of the vehicle and configured to obtain surrounding detection information.

Such a non-image sensor may be a non-image sensor having relatively many channels and relatively excellent angular resolution. For example, the angular resolution of the non-image sensor may be 5°. However, the present disclosure is not limited thereto, and the non-image sensor of the present disclosure may mean a sensor having the most excellent angular resolution among possible sensors.

The second sensor 120 may be a sensor for detecting vehicle interior information or vehicle driving information. For example, the second sensor 120 may include a vehicle speed sensor 121 for detecting the vehicle speed, a steering angle sensor 122 for detecting a steering angle, a torque sensor 123 for detecting a steering torque, or an yaw rate sensor 124 for detecting the yaw rate of the vehicle. In addition, the second sensor 120 may further include sensors for detecting data related to the vehicle interior or vehicle driving such as a brake sensor for detecting the braking force of the vehicle, a motor position sensor for detecting information on the steering motor, a vehicle motion detection sensor or a vehicle attitude detection sensor for detecting the movement of the vehicle.

The controller 130 may process data obtained from at least one of the first sensor 110 and the second sensor 120. Specifically, the controller 130 may receive data from each of the first sensor 110 and the second sensor 120, recognize a specific object (guardrail, traffic light, pedestrian, etc.), and output the control signal for controlling the vehicle.

For example, the controller 130 may recognize the object (or a target) using surrounding detection information input from the first sensor 110 and driving information input from the second sensor 120, analyze characteristics (moving speed, position, angle of incidence, color, etc.) of the object, and recognize the object which meets the specific conditions as the structure including the guardrail.

As another example, the controller 130 may detect and recognize a target using surrounding detection information input from the first sensor 110 and acquire physical quantity information such as a position, speed, and movement direction of the target. In addition, the controller 130 may acquire the vehicle driving information such as a vehicle speed and a vehicle position by using information input from the second sensor 120. Then, the controller 130 may determine the possibility of a collision between the target and the vehicle using the acquired physical quantity information and the vehicle driving information, and if it is determined that there is a possibility of a collision, the controller 130 may control the behavior of the vehicle (deceleration, braking, avoidance steering, etc.) by generating and outputting the control signal for the vehicle to the actuator 140.

Meanwhile, the controller 130 may perform a plurality of functions for the adaptive driving assistance system (ADAS). Here, ADAS may mean various types of advanced driver assistance systems, and driver assistance systems may include, for example, the autonomous emergency braking (AEB) system, the smart parking assistance system (SPAS), the blind spot detection (BSD) system, the adaptive cruise control (ACC) system, the lane departure warning system (LDWS), the lane keeping assist system (LKAS), the lane change assist system (LCAS), and the like. However, it is not limited thereto.

The controller 130 may be implemented as the form of an electronic control unit (ECU), a microcontroller 130 unit (MCU), or the like.

The actuator 140 may be driven according to the control operation of the controller 130. Specifically, when the controller 130 outputs the control signal, the actuator 140 may receive the control signal and may be driven to perform the corresponding control operation indicated by the control signal.

The actuator 140, for example, may include the braking actuator that performs braking of the vehicle, the steering actuator that performs the collision avoidance steering of the vehicle, and the display to visually display alarm messages to the driver, the alarm actuator that outputs a warning sound, the haptic actuator that informs the driver tactilely, or the like. However, it is not limited thereto.

Hereinafter, the object recognition apparatus capable of performing various functions of the controller 130 described above will be described in detail.

Figure 2:
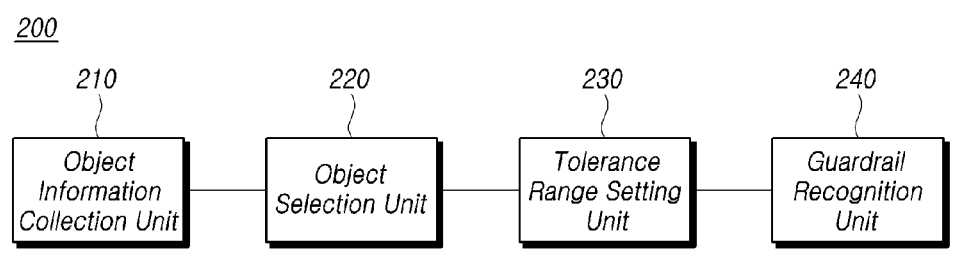
FIG. 2 is a block diagram illustrating an object recognition apparatus according to the present disclosure.

FIG. 2 is a block diagram illustrating the object recognition apparatus 200 according to the present disclosure.

Referring to FIG. 2, the object recognition apparatus 200 according to the present disclosure may include the object information collection unit 210, the object selection unit 220, the tolerance range setting unit 230, and the guardrail recognition unit 240. In this disclosure, the object information collection unit, the object selection unit, the tolerance range setting and the guardrail recognition unit may be used with the same meaning as the object information collector, the object selector, the tolerance range setter and the guardrail recognizer, respectively.

The object information collection unit 210 may collect object information based on driving information of the vehicle and surrounding detection information sensed around the vehicle.

Here, the driving information of the vehicle may be information detected by the second sensor 120, and the driving information may include, for example, the vehicle speed, the yaw rate, the steering angle of a steering wheel, and the steering angle of a wheel.

Here, the surrounding detection information may be information detected by the first sensor 110, and the surrounding detection information may include, for example, information detected in the front, side, rear of the vehicle, or a combination thereof. However, it is not limited thereto.

The object information may mean information on the object, and may include all physical information on the object. For example, the object information may include information on the location of the object, the absolute speed, the moving direction, the color, the appearance, the type, the relative speed of the object with respect to a vehicle, and the like.

The object information may include at least one of information of stationary object information on a stationary object detected by the first sensor 110 as a stationary object and moving object information on a moving object detected by the first sensor 110 as a moving object.

For example, the object information collection unit 210 may calculate the relative speed of the object with respect to the vehicle based on the driving information and the surrounding detection information, and select the object information for at least one object among moving objects and stationary objects classified according to the relative speed.

The object selection unit 220 may select the object corresponding to a predetermined first tolerance range based on the object information.

Here, the first tolerance range may mean a condition for recognizing a specific structure, such as the guardrail. For example, the first tolerance range may refer to conditions such as that objects clustered is within a certain range, and that the longitudinal distance between one or more clustered objects is regular with respect to the vehicle. However, the present invention is not limited thereto, and more detailed information will be described later with reference to FIGS. 5 and 6.

If the moving object exists among objects corresponding to the first tolerance range, the tolerance range setting unit 230 may set the second tolerance range based on driving information and object information.

Here, the second tolerance range may mean the condition for recognizing a specific structure, such as the guardrail, similar to the first tolerance range. The structure such as the guardrail may be generally recognized as the stationary object when detected by the first sensor 110, for example, a radar, but when a part of this structure is detected by the radar, It may be recognized as a moving object according to the incidence angle of the structure. Accordingly, such a structure that can be recognized as the moving object may be recognized as the specific structure such as the guardrail by using the second tolerance set separately from the first tolerance range.

The guardrail recognition unit 240 may determine whether the moving object falls within the second tolerance range based on the object information, and recognize the guardrail based on object information of the moving object corresponding to the second tolerance range.

Meanwhile, if the object included in the first tolerance range is the stationary object, the guardrail recognition unit 240 may recognize the corresponding object as the guardrail based on object information of the object included in the first tolerance range.

As described above, the object recognition apparatus 200 according to the present disclosure may provide an effect of accurately recognizing a specific structure, such as the guardrail, even if physical characteristics of an object detected by the sensor are distorted.

Hereinafter, an embodiment of collecting object information will be described.

Figure 3:
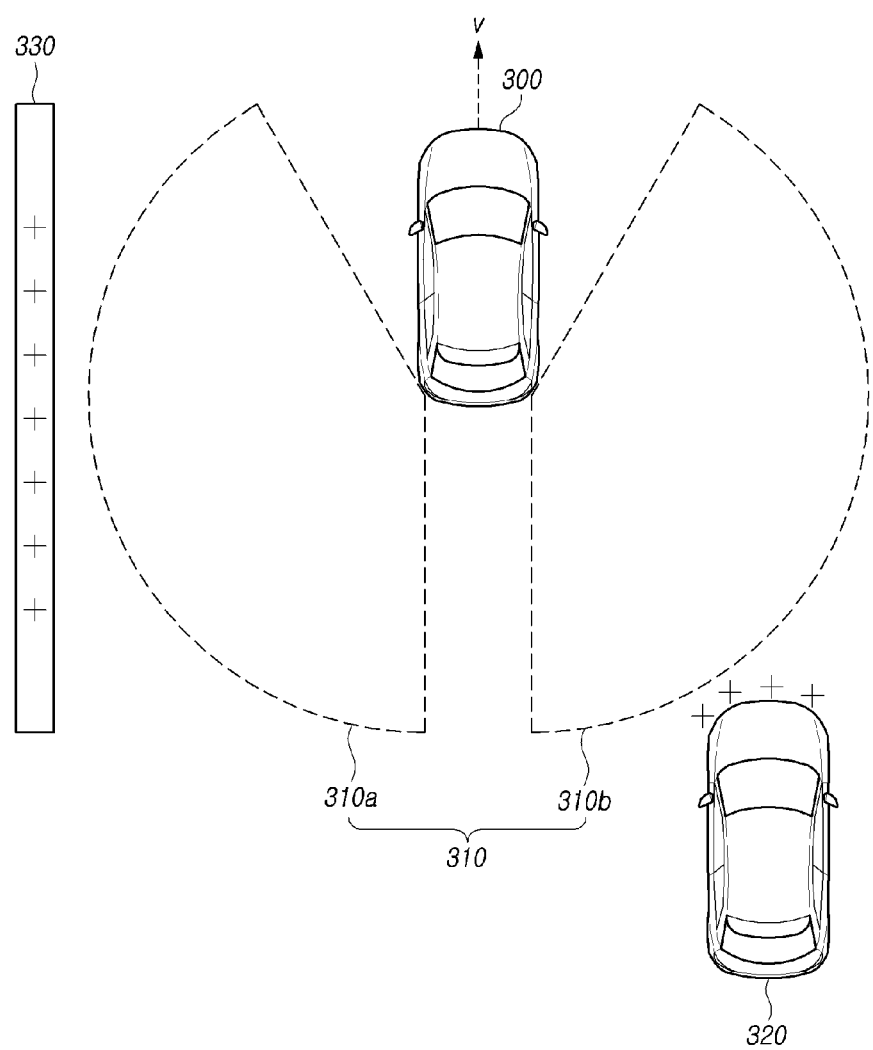
FIG. 3 is a diagram illustrating an embodiment of collecting object information according to the present disclosure.
Figure 4:
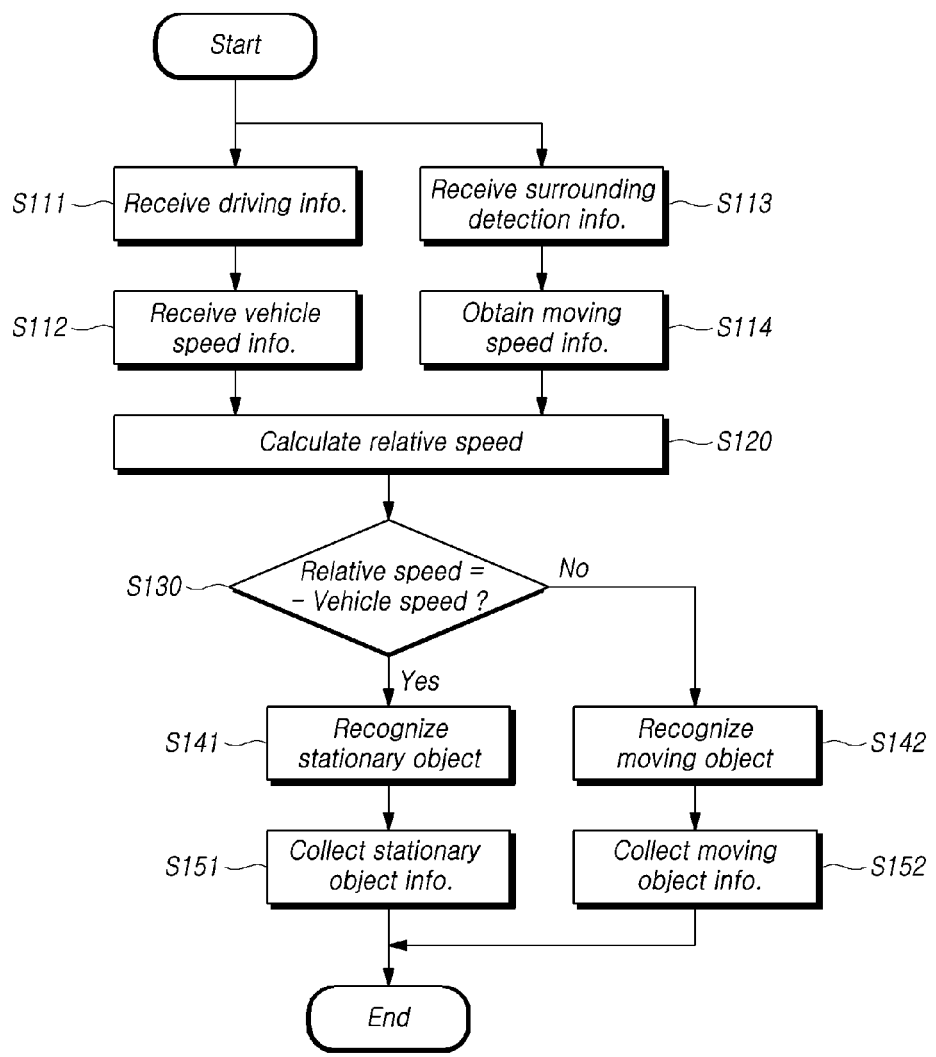
FIG. 4 is a flowchart for explaining the embodiment shown in FIG. 3.

FIG. 3 is a diagram illustrating an embodiment of collecting object information according to the present disclosure, and FIG. 4 is a flowchart for explaining the embodiment shown in FIG. 3.

Referring to FIG. 3, when the vehicle 300 including the object recognition apparatus 200 according to the present disclosure and the vehicle control system 100 operates is traveling, the first sensor 110 mounted on the vehicle 300 may detect the structure 310 such as the guardrail and another vehicle 320 positioned within the detection area. Here, as shown in FIG. 3, the first sensor 110 may be mounted at the rear of the vehicle 300 to detect the object within the detection area in the rear side of the vehicle 300, but is limited thereto. Alternatively, the first sensor 110 may be mounted in front of the vehicle 300 to detect the front of the vehicle 300.

The radar sensor as the first sensor 110 may transmit a radar signal to an object (guardrail, other vehicle 320, etc.) within the radiation area corresponding to the detection area, and may receive the radar signal reflected from the object. In addition, the object may be detected by processing using a Doppler effect or the like, and physical characteristics of the object such as the moving speed of the object may be obtained.

The object recognition apparatus 200 mounted on the traveling vehicle 300 may calculate the relative speed of the object with respect to the vehicle 300 by using driving information such as vehicle speed of the vehicle 300 and surrounding detection information, and may classify the stationary objects and moving objects by using the calculated relative speed of the object.

Referring to FIG. 4, the object recognition apparatus 200 may receive driving information detected by the second sensor 120 (S111), and obtain vehicle speed information from the received driving information (S112).

Meanwhile, the object recognition apparatus 200 may receive the surrounding detection information detected by the first sensor 110 (S113), and obtain moving speed information of the object from the received surrounding detection information (S114).

Then, the object recognition apparatus 200 may calculate the relative speed of the object with respect to the vehicle 300 using the vehicle speed information of the vehicle 300 and the moving speed of the object (S120).

Here, the relative speed can be calculated by the following equation.

$$v_{rel} = v_{object} - v_{host\ vehicle}$$ [Equation 1]

The object recognition apparatus 200, then, may determine whether the magnitude of the relative speed of the object with respect to the vehicle 300 is the same as the vehicle speed of the vehicle 300 and the direction of the relative speed of the object with respect to the vehicle 300 is opposite to the direction of the vehicle speed of the vehicle 300 (S130).

If the relative speed of the object to the vehicle 300 satisfies the above-described condition (S130), the object recognition apparatus 200 may recognize the object as the stationary object (S141), and may collect stationary object information on the stationary object (S151).

If the relative speed of the object with respect to the vehicle 300 does not satisfy the above-described condition (S130), the object recognition apparatus 200 may recognize the object as the moving object (S142), and may collect the moving object information on the moving object (S152).

As described above, the object recognition apparatus 200 according to the present disclosure may provide an effect capable of recognizing the structure 310 such as the guardrail more rapidly by classifying the stationary object and the moving object using the relative speed of the object with respect to the vehicle 300.

Meanwhile, both the stationary object and the moving object may be included within a certain range and may be clustered. If the clustered object satisfies a specific condition, the object may be recognized as the structure 310 such as the guardrail.

Hereinafter, an embodiment of selecting an object that falls within the tolerance range will be described.

Figure 5:
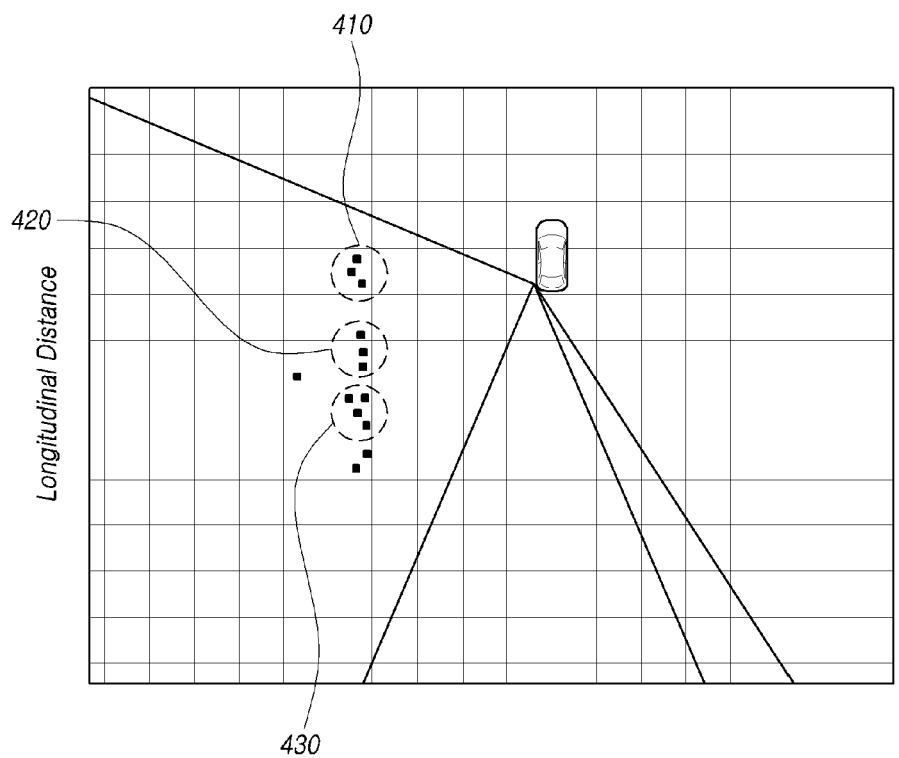
FIG. 5 is a diagram illustrating an embodiment of selecting an object that falls within the tolerance range according to the present disclosure.
Figure 6:
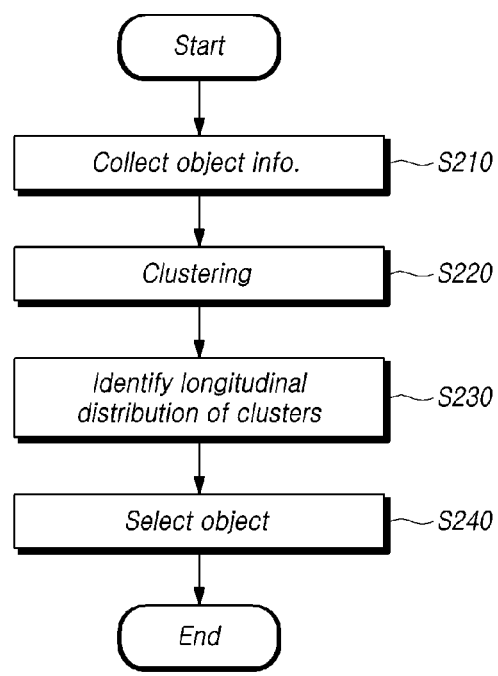
FIG. 6 is a flowchart for explaining the embodiment shown in FIG. 5.

FIG. 5 is a diagram illustrating an embodiment of selecting an object that falls within the tolerance range according to the present disclosure, and FIG. 6 is a flowchart for explaining the embodiment shown in FIG. 5.

Referring to FIG. 5, in the case that the first sensor 110 is a radar sensor, the radar sensor may represent points reflected from the surface of the object such as the guardrail or another vehicle 320 as illustrated in FIG. 5.

In this case, the object recognition apparatus 200 may cluster and group points included in a certain range among the reflected points, identify the longitudinal distribution between the clustered clusters 410, 420, 430, and select the objects that exist at regular longitudinal intervals.

Referring to FIG. 6, for example, the object recognition apparatus 200 may collect object information (S210) and may cluster objects according to the predetermined condition using the object information (S220).

For example, the object selection unit 220 may cluster objects located within the certain range using a clustering technique for objects included in object information.

Then, the object recognition apparatus 200 may identify the longitudinal distribution of the clustered clusters 410, 420, and 430 (S230), and select the object corresponding to a predetermined criterion (S240).

For example, the object selection unit 220 may identify the longitudinal distribution of the clustered clusters 410, 420, and 430, and select objects corresponding to clusters 410, 420, and 430 distributed within a predetermined reference longitudinal interval.

As described above, the object recognition apparatus 200 according to the present disclosure may provide an effect of accurately recognizing the structure 310 such as the guardrail by partially selecting an object through the clustering manner.

Meanwhile, the objects included in the clusters 410, 420, and 430 may be mainly the stationary objects, but some objects included in the clusters 410, 420, and 430 may be the moving objects. At this time, the moving object may be that the actual moving object is detected by the first sensor 110. However, a portion of the non-moving structure 310 detected by the first sensor 110 such as the radar may be recognized as the moving object.

Even if the structure 310 is recognized as the moving object, it needs to be recognized as the structure 310 such as the guardrail.

Figure 7:
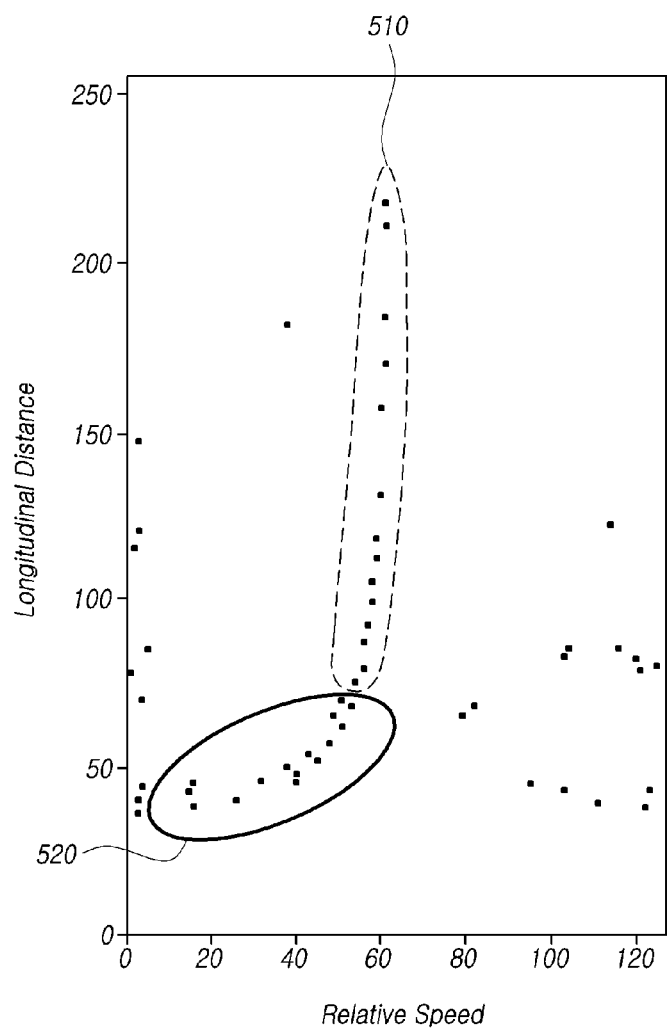
FIG. 7 is a diagram illustrating an object which falls within the tolerance range according to the present disclosure.
Figure 8:
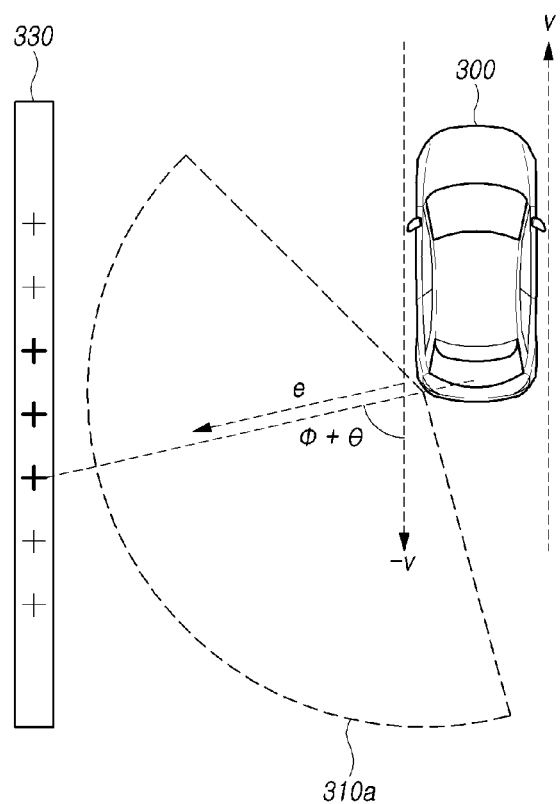
FIG. 8 is a diagram illustrating another embodiment of selecting the object which falls within the tolerance range according to the present disclosure.
Figure 9:
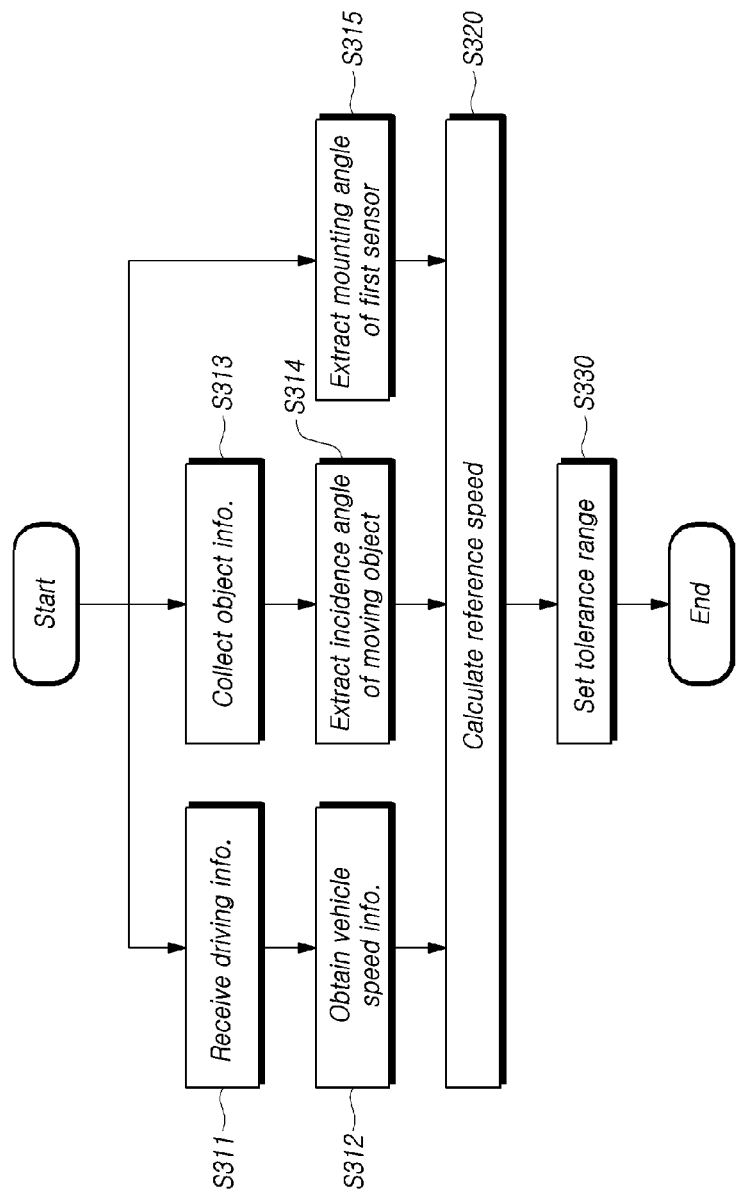
FIG. 9 is a flowchart for explaining the embodiment shown in FIG. 8.

FIG. 7 is a diagram illustrating an object which falls within the tolerance range according to the present disclosure, FIG. 8 is a diagram illustrating another embodiment of selecting the object which falls within the tolerance range according to the present disclosure, and FIG. 9 is a flowchart for explaining the embodiment shown in FIG. 8.

Referring to FIG. 7, the non-moving structure 310 such as the guardrail generally has certain characteristics. For example, the magnitude of the relative speed of the structure 310 may be the same as the magnitude of the vehicle speed, and the direction of the relative speed may be opposite to the direction of the vehicle speed.

Accordingly, as shown in FIG. 7, if the magnitude of the relative speed of the object is constant, and the longitudinal distribution of the first cluster 510 clustered by the clustering method as described above with reference to FIGS. 5 and 6 is within a predetermined reference interval, the corresponding objects may be easily recognized as structures 310 such as guardrails.

However, as shown in FIG. 7, in the case of the second cluster 520 clustered by the clustering method as described above with reference to FIGS. 5 and 6, the structure 310 such as the guardrail detected by the first sensor 110 may be recognized as the moving object and may be included in the second cluster 520. In this case, unlike the first cluster 510, the longitudinal distribution of the second cluster 520 is within a predetermined reference interval, but the relative speed may not be constant.

This is because when the first sensor 110, such as the radar, is disposed on the side of the vehicle 300, the relative speed of the stationary object is distorted through the incidence angle of the object due to the physical characteristic of the side radar.

Accordingly, due to such physical characteristics, an error may occur in the process of collecting object information using the first tolerance range, which is the initial condition for determining the structure 310 such as the guardrail.

Referring to FIG. 8, objects detected by the first sensor 110 such as the side radar may be physically affected by the incidence angle φ of the object. The Doppler value reflecting the incidence angle of the object may be extracted, which may cause the error in the relative speed of the object. Also, this error may be further increased by the mounting angle θ of the first sensor 110.

Accordingly, the object recognition apparatus 200 may set the second tolerance range based on the vehicle speed v of the vehicle 300 and the incidence angle φ of the object, and may select valid data among moving objects based on the second tolerance range.

For example, the tolerance range setting unit 230 may obtain the vehicle speed of the vehicle 300 from driving information, extract the incidence angle of the moving object from the object information, and set the second tolerance range based on the incidence angle of the moving object and the vehicle speed of the vehicle. In addition, the guardrail recognition unit 240 may select valid data that can be recognized as the guardrail among moving objects using the second tolerance range.

In more detail with reference to FIG. 8, for example, the tolerance range setting unit 230 may calculate the reference vector (−v) that is in a direction opposite to the direction of the vehicle speed (v) and has the same magnitude of the vehicle speed (v), may calculate the unit vector (e) having an angle equal to the incidence angle from the reference vector (−v), may perform the projection operation for the reference vector (−v) onto the unit vector (e), and may set the reference speed calculated by the projection operation as the second tolerance range.

In this case, the tolerance range setting unit 230 may calculate the unit vector having an angle equal to the sum of the mounting angle previously stored and the incidence angle of the radar sensor from the reference vector.

The second tolerance range described above may be specifically determined by the following equation 2.

$$v_{ref} = -v_{host\ vehicle} \times \cos(\phi + \theta)$$ [Equation 2]

Here, $v_{ref}$ is the reference speed, $v_{host\ vehicle}$ is the vehicle speed of the vehicle 300, φ is the incidence angle of the object in the case that the first sensor 110 is the radar sensor, and θ is be the mounting angle of the first sensor 110.

Referring to FIG. 9, the object recognition apparatus 200 may receive driving information (S311) and obtain vehicle speed information from the driving information (S312). In addition, the object recognition apparatus 200 may collect object information (S313) and extract the incidence angle of the moving object from the object information (S314). Also, the object recognition apparatus 200 may extract the mounting angle of the first sensor 110 (S315). Here, the mounting angle of the first sensor 110 may be stored in advance in a memory (not shown) included in the object recognition apparatus 200.

The object recognition apparatus 200 may calculate the reference speed by substituting the vehicle speed, the incidence angle of the moving object, and the mounting angle of the first sensor 110 into [Equation 2] described above (S320), and may set the tolerance range (S330). Here, the tolerance range may mean the second tolerance range.

The object recognition apparatus 200 according to the present disclosure may provide an effect of preventing malfunction by setting a criterion for recognizing the structure 310 such as the guardrail, even if the physical characteristics of the object are distorted.

Figure 10:
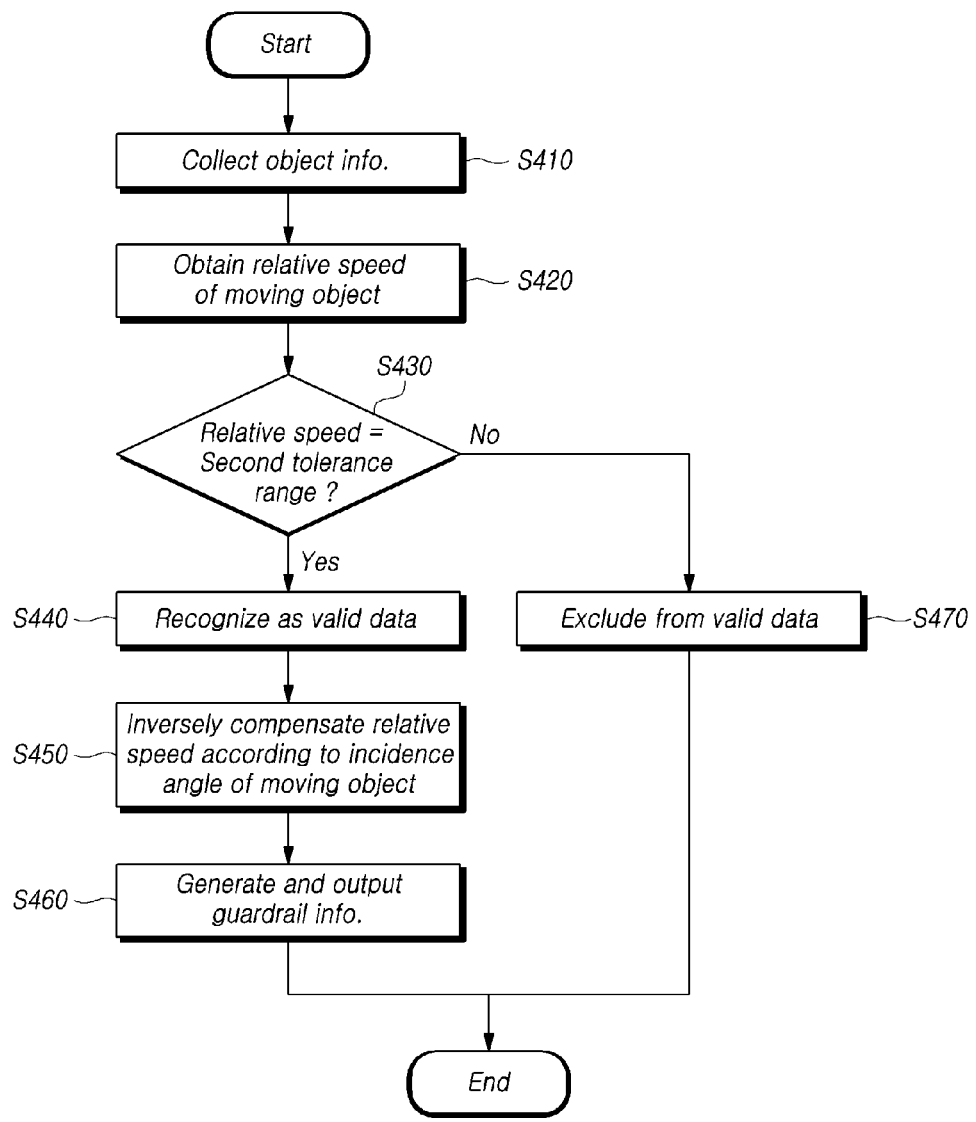
FIG. 10 is a flowchart illustrating an embodiment of selecting valid data from moving objects and recognizing the guardrails according to the present disclosure.

FIG. 10 is a flowchart illustrating an embodiment of selecting valid data from moving objects and recognizing the guardrails according to the present disclosure.

Referring to FIG. 10, the object recognition apparatus 200 according to the present disclosure may collect object information (S410), and obtain the relative speed of the moving object from the object information (S420).

For example, the guardrail recognition unit 240 may obtain the relative speed of the moving object from object information.

Then, the object recognition apparatus 200 may compare the relative speed of the object with respect to the vehicle 300 with the second tolerance range (S430). In more detail, the object recognition apparatus 200 may determine whether the relative speed of the object with respect to the vehicle 300 is the same as the reference speed set as the second tolerance range within a predetermined error range.

For example, the guardrail recognition unit 240 may compare the relative speed of the moving object with the reference speed included in the second tolerance range, and determine whether the moving object falls within the second tolerance range based on the comparison result.

For another example, the guardrail recognition unit 240 may calculate a difference value between the relative speed of the moving object and the reference speed, and if the difference value is within a preset error range, the guardrail recognition unit 240 may determine that the moving object falls within the second tolerance range.

If the relative speed is within the second tolerance range (i.e., the relative speed falls within the second tolerance range), the object recognition apparatus 200 may recognize the moving object information for the moving object as valid data (S440), may inversely compensate the relative speed according to the incidence angle of the moving object (S450), and may generate and output compensated guardrail information (S460).

For example, if the moving object falls within the second tolerance range, the guardrail recognition unit 240 may inversely compensate the relative speed of the moving object to generate correction object information, and may recognize the correction object included in the correction object information as the guardrail.

Meanwhile, if the relative speed is not within the second tolerance range, the object recognition apparatus 200 may exclude moving object information of the moving object from valid data (S470).

Accordingly, the object recognition apparatus 200 according to the present disclosure may provide an effect of accurately recognizing the guardrail.

Figure 11:
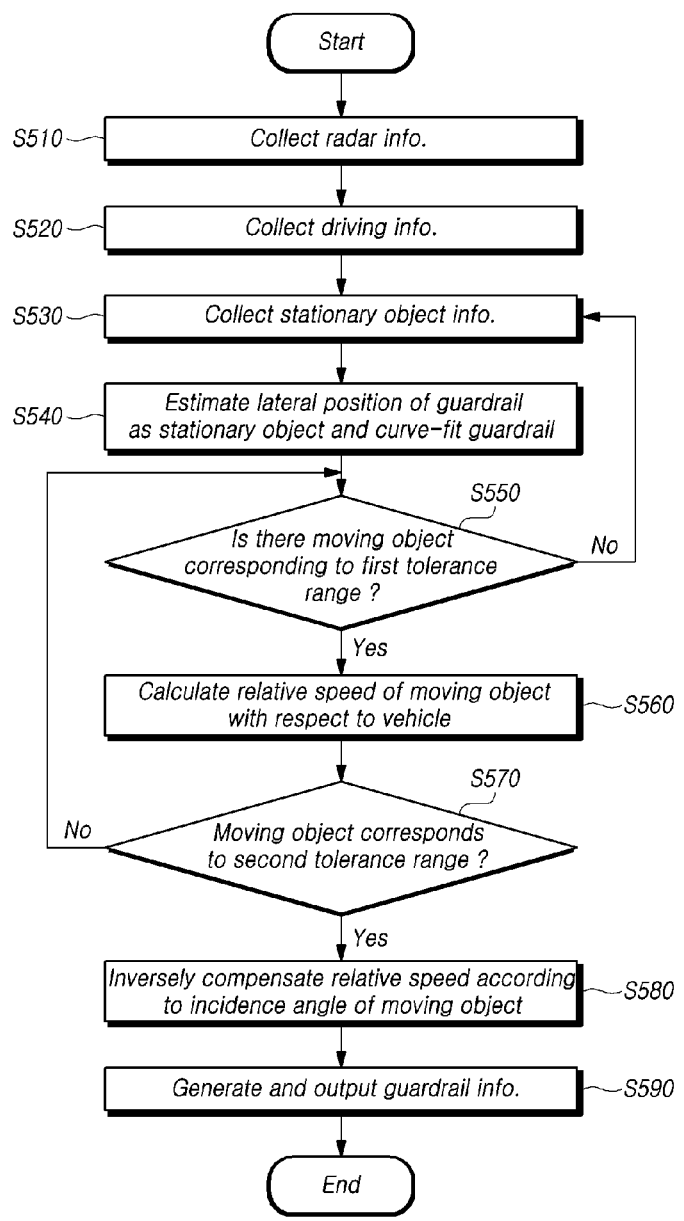
FIG. 11 is a flowchart illustrating another embodiment of selecting the object corresponding to the tolerance range and recognizing the guardrail according to the present disclosure.

FIG. 11 is a flowchart illustrating another embodiment of selecting the object corresponding to the tolerance range and recognizing the guardrail according to the present disclosure.

Referring to FIG. 11, the object recognition apparatus according to the present disclosure may collect radar information from the radar as the first sensor 110 (S510), and collect driving information from the second sensor 120 (S520).

Then, the object recognition apparatus 200 may collect stationary object information using radar information and driving information (S530).

Thereafter, the object recognition apparatus 200 may estimate a lateral position of the guardrail as the stationary object, and may curve-fit the guardrail (S540).

Then, the object recognition apparatus 200 may identify whether there is the moving object corresponding to the first tolerance range (S550), and if there is no moving object corresponding to the first tolerance range, the object recognition apparatus 200 may again collect the stationary object information (S530).

If there is the moving object corresponding to the first tolerance range, the object recognition apparatus 200 may calculate the relative speed of the moving object with respect to the vehicle 300 (S560), and may identify whether the moving object falls within the second tolerance range (S570).

If the moving object does not fall within the second tolerance range, the object recognition apparatus 200 may again check whether there is the moving object corresponding to the first tolerance range (S550).

If the moving object falls within the second tolerance range, the object recognition apparatus 200 may inversely compensate for the relative speed according to the incidence angle of the moving object (S580), and accordingly generate and output guardrail information (S590).

The object recognition apparatus 200 according to the present embodiment may be implemented as a computer system including at least one or more elements of one or more processors, a memory, and a storage unit. The processor may be a CPU or semiconductor device that executes processing instructions stored in a memory and/or storage unit. The memory and storage unit may include various types of volatile/nonvolatile storage media. For example, the memory may include ROM and RAM.

In the computer system of the object recognition apparatus 200 having such a hardware configuration, software or programs for performing functions of the object information collection unit 210, the object selection unit 220, the tolerance range setting unit 230, and the guardrail recognition unit according to an embodiment may be installed in the memory or storage unit and executed by the processor.

Hereinafter, the overall flow of the object recognition method according to the present disclosure will be described.

Figure 12:
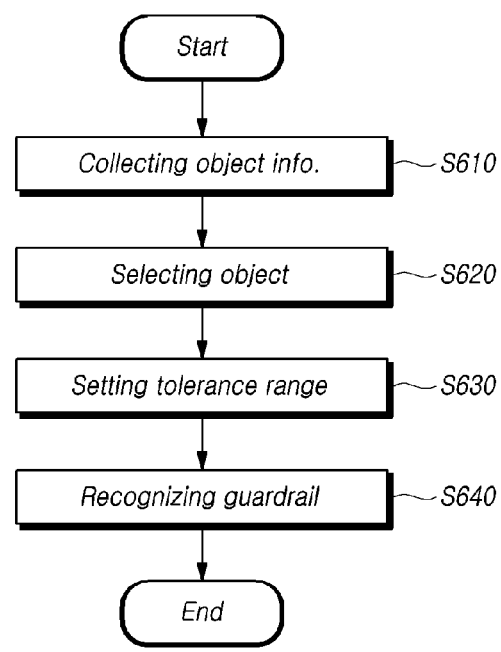
FIG. 12 is a flowchart illustrating the object recognition method according to the present disclosure.

FIG. 12 is a flowchart illustrating the object recognition method according to the present disclosure.

Referring to FIG. 12, the object recognition method according to the present disclosure may include the object information collection step of collecting object information based on driving information of the vehicle 300 and surrounding detection information around the vehicle 300, the object selection step for selecting the object corresponding to the first tolerance range set in advance based on the object information, the tolerance range setting step for setting the second tolerance range based on driving information and object information if the moving object exists among objects corresponding to the first tolerance range, and the guardrail recognition step for determining whether the moving object falls within the second tolerance range and recognizing the guardrail based on object information of the moving object corresponding to the second tolerance range.

Here, in the object selection step, objects located within a certain range may be clustered using the clustering technique for objects included in the object information, and objects corresponding to the clusters distributed within a predetermined reference longitudinal interval may be selected by identifying the longitudinal distribution of the clustered clusters.

Here, in the tolerance range setting step, the vehicle speed of the vehicle 300 may be obtained from driving information, the incidence angle of the moving object may be extracted from object information, and the second tolerance range may be set based on the incidence angle and the vehicle speed.

Specifically, in the tolerance range setting step, the reference vector in the direction opposite to the direction of the vehicle speed and the same as the magnitude of the vehicle speed may be calculated, the unit vector having an angle equal to the incidence angle from the reference vector may be calculated, and the projection operation in which the reference vector is projected onto the unit vector may be performed, and the reference speed calculated by the projection operation may be set as the second tolerance range.

In the guardrail recognition step, the relative speed of the moving object may be obtained from object information, the relative speed of the moving object may be compared with the reference speed included in the second tolerance range, and it may be determined whether the moving object falls within the second tolerance range based on the comparison result.

In the guardrail recognition step, if the object included in the first tolerance range is the stationary object, the guardrail may be recognized based on object information of the object included in the first tolerance range.

As described above, according to the present disclosure, it may be provided with the object recognition apparatus 200 and method for accurately recognizing the structure 310 such as the guardrail, even if physical characteristics are distorted.

In addition, according to the present disclosure, the present disclosure may provide the object recognition apparatus 200 and method for providing driving convenience and driving stability to the driver by accurately recognizing the structure 310 such as the guardrail.

The above description and attached drawings have been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An object recognition apparatus comprising:
    an object information collector configured to collect object information based on driving information of a vehicle and surrounding detection information detected around the vehicle;
    an object selector configured to select an object corresponding to a predetermined first tolerance range based on the object information;

a tolerance range setter configured to set a second tolerance range based on the driving information and the object information when a moving object exists among the objects corresponding to the first tolerance range; and a guardrail recognizer configured to determine whether the moving object falls within the second tolerance range based on the object information, and recognize a guardrail based on object information of the moving object corresponding to the second tolerance range, wherein the object selector clusters the objects located within a specific range using a clustering with respect to the objects included in the object information, and selects the objects corresponding to a cluster distributed within a predetermined reference longitudinal interval by checking a longitudinal distribution of the clustered clusters.

2. The object recognition apparatus of claim 1, wherein the object information collector calculates a relative speed of the object with respect to the vehicle based on the driving information and the surrounding detection information, and collects object information on at least one object from among the moving object and a stationary object classified according to the relative speed.

3. The object recognition apparatus of claim 1, wherein the tolerance range setter obtains a vehicle speed of the vehicle from the driving information, extracts an incidence angle of the moving object from the object information, and sets the second tolerance range based on the incidence angle and the vehicle speed.

4. The object recognition apparatus of claim 3, wherein the tolerance range setter calculates a reference vector which has a direction opposite to a direction of the vehicle speed and is equal to a magnitude of the vehicle speed, calculates a unit vector having an angle equal to the incidence angle from the reference vector, performs a projection operation of the reference vector onto the unit vector, and sets the second tolerance range based on a reference speed calculated by the projection operation.

5. The object recognition apparatus of claim 4, wherein the tolerance range setter calculates the unit vector having an angle equal to the sum of the pre-stored mounting angle of a radar sensor and the incidence angle from the reference vector.

6. The object recognition apparatus of claim 1, wherein the guardrail recognizer acquires the relative speed of the moving object from the object information, compares the relative speed of the moving object with a reference speed included in the second tolerance range, and determines whether the moving object falls within the second tolerance range based on the comparison result.

7. The object recognition apparatus of claim 6, wherein the guardrail recognizer calculates a difference value between the relative speed of the moving object and the reference speed, and if the difference value is within a predetermined error range, determines that the moving object falls within the second tolerance range.

8. The object recognition apparatus of claim 6, wherein the guardrail recognizer, when the moving object falls within the second tolerance range, generates correction object information by inversely compensating the relative speed of the moving object, and recognizes the correction object included in the correction object information as the guardrail.

9. The object recognition apparatus of claim 1, wherein the guardrail recognizer, when the object included in the first tolerance range is a stationary object, recognizes the guardrail based on object information of the object included in the first tolerance range.

10. An object recognition method comprising:
collecting object information based on driving information of a vehicle and surrounding detection information detected around the vehicle;
selecting an object corresponding to a predetermined first tolerance range based on the object information;
setting a second tolerance range based on the driving information and the object information when a moving object exists among the objects corresponding to the first tolerance range; and
determining whether the moving object falls within the second tolerance range based on the object information, and recognize a guardrail based on object information of the moving object corresponding to the second tolerance range,
wherein collecting object information comprises clustering the objects located within a specific range using a clustering with respect to the objects included in the object information, and selecting the objects corresponding to a cluster distributed within a predetermined reference longitudinal interval by checking a longitudinal distribution of the clustered clusters.

11. The object recognition method of claim 10, wherein setting the second tolerance range comprises obtaining a vehicle speed of the vehicle from the driving information, extracting an incidence angle of the moving object from the object information, and setting the second tolerance range based on the incidence angle and the vehicle speed.

12. The object recognition method of claim 11, wherein setting the second tolerance range comprises calculating a reference vector which has a direction opposite to a direction of the vehicle speed and is equal to a magnitude of the vehicle speed, calculating a unit vector having an angle equal to the incidence angle from the reference vector, performing a projection operation of the reference vector onto the unit vector, and setting the second tolerance range based on a reference speed calculated by the projection operation.

13. The object recognition method of claim 10, wherein recognizing the guardrail comprises acquiring the relative speed of the moving object from the object information, comparing the relative speed of the moving object with a reference speed included in the second tolerance range, and determining whether the moving object falls within the second tolerance range based on the comparison result.

14. The object recognition method of claim 10, wherein recognizing the guardrail comprises, when the object included in the first tolerance range is a stationary object, recognizing the guardrail based on object information of the object included in the first tolerance range.

* * * * *